US010155857B2

United States Patent
Carella et al.

(10) Patent No.: US 10,155,857 B2
(45) Date of Patent: Dec. 18, 2018

(54) FLUOROPOLYMER COMPOSITION

(71) Applicant: SOLVAY SPECIALTY POLYMERS ITALY S.P.A., Bollate (IT)

(72) Inventors: Serena Carella, Milan (IT); Mattia Bassi, Milan (IT); Paolo Toniolo, Cesate (IT); Julio A. Abusleme, Saronno (IT); Stefano Mortara, Arconate (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 0 days.

(21) Appl. No.: 15/263,334

(22) Filed: Sep. 12, 2016

(65) Prior Publication Data

US 2017/0226312 A1    Aug. 10, 2017

Related U.S. Application Data

(63) Continuation of application No. 13/878,030, filed as application No. PCT/EP2011/067878 on Oct. 13, 2011, now Pat. No. 9,441,087.

(30) Foreign Application Priority Data

Oct. 15, 2010  (EP) .................................... 10187726

(51) Int. Cl.
| | |
|---|---|
| *C08K 3/22* | (2006.01) |
| *B29D 99/00* | (2010.01) |
| *C08K 3/36* | (2006.01) |
| *C08J 5/18* | (2006.01) |
| *C08K 3/014* | (2018.01) |

(52) U.S. Cl.
CPC ................. *C08K 3/22* (2013.01); *C08J 5/18* (2013.01); *C08K 3/014* (2018.01); *C08K 3/36* (2013.01); *C08J 2327/12* (2013.01); *C08K 2003/2227* (2013.01); *C08K 2003/2241* (2013.01)

(58) Field of Classification Search
USPC ......................................... 524/546, 408, 430
See application file for complete search history.

(56) References Cited

U.S. PATENT DOCUMENTS

| | | | |
|---|---|---|---|
| 6,706,351 | B2 | 3/2004 | Abusleme et al. |
| 7,381,463 | B2 | 6/2008 | Abusleme et al. |

(Continued)

FOREIGN PATENT DOCUMENTS

| | | |
|---|---|---|
| JP | S63-45123 A | 2/1988 |
| JP | H08-037942 A | 2/1996 |

(Continued)

*Primary Examiner* — Mark Kaucher
*Assistant Examiner* — Henry Hu

(57) ABSTRACT

The invention pertains to a thermoplastic fluoropolymer composition comprising: —at least one semi-crystalline polymer comprising recurring units derived from ethylene and at least one of chlorotrifluoroethylene (CTFE) and tetrafluoroethylene (TFE), said polymer having a heat of fusion of at most 35 J/g [polymer (A)]; and —from 0.05 to 5% by weight, based on weight of polymer (A), of particles of at least one inorganic UV blocker compound, said particles having an average particle size of 1 to 150 nm, said composition being suitable for manufacturing UV-opaque films having outstanding transparency and haze properties.

20 Claims, 3 Drawing Sheets

Film from Ex. 5

(56) References Cited

U.S. PATENT DOCUMENTS

| | | | |
|---|---|---|---|
| 9,441,087 B2* | 9/2016 | Carella | C08K 5/005 |
| 2003/0138637 A1* | 7/2003 | Aruga | C08J 5/18 |
| | | | 428/422 |
| 2005/0186433 A1 | 8/2005 | Hetzler et al. | |
| 2005/0268961 A1 | 12/2005 | Hetzler et al. | |
| 2006/0052486 A1 | 3/2006 | Fujita | |
| 2007/0017567 A1 | 1/2007 | Gronet et al. | |
| 2009/0162652 A1 | 6/2009 | Ranade et al. | |
| 2010/0092759 A1* | 4/2010 | Fan | B32B 27/28 |
| | | | 428/323 |
| 2010/0151180 A1 | 6/2010 | Bravet et al. | |
| 2011/0232735 A1 | 9/2011 | Bizet et al. | |
| 2013/0192755 A1* | 8/2013 | Carella | B32B 27/08 |
| | | | 156/330 |

FOREIGN PATENT DOCUMENTS

| | | |
|---|---|---|
| JP | 09-288914 A | 11/1997 |
| JP | 10-147681 A | 6/1998 |
| JP | H11-343316 A | 12/1999 |
| JP | 2000-287559 A | 10/2000 |
| JP | 2004-283699 A | 10/2004 |
| JP | 2010-143948 A | 7/2010 |
| WO | 2009101343 A1 | 8/2009 |
| WO | 2012049193 A1 | 4/2012 |

\* cited by examiner

FLUOROPOLYMER COMPOSITION

CROSS-REFERENCE TO RELATED APPLICATIONS

This application is a continuation of U.S. Ser. No. 13/878,030, filed Apr. 12, 2013, which is a U.S. national stage entry under 35 U.S.C. 071 of International Application No. PCT/EP2011/067878 filed Oct. 13, 2011, which claims priority to European application No. EP 10187726.4 filed on Oct. 15, 2010. The entire contents of each of these applications are expressly incorporated herein by this reference.

TECHNICAL FIELD

The invention pertains to a fluoropolymer composition comprising a copolymer of ethylene with chlorotrifluoroethylene, tetrafluoroethylene or mixtures thereof and certain nanosized fillers, said composition having homogenous dispersion of the filler and thus transparency to visible light.

BACKGROUND ART

Copolymers of ethylene with chlorotrifluoroethylene, tetrafluoroethylene or mixtures thereof are well known in the art, in particular for the manufacture of films and protective layers.

In this field, weatherability, stain resistance and transparency are often considered as valuable properties for a protective film; this is particularly true when these protective films are intended to be used as agricultural films, as protective sheeting for photovoltaic cells, as packaging materials and the like.

In all these fields of use, it has been found particularly advantageous to introduce in the polymer matrix suitable compounds which substantially prevent penetration of ultraviolet light, without affecting penetration of visible light.

Nevertheless, transparency and haze of the films are generally affected due to the poor dispersability of these UV blockers in the fluorinated matrix.

JP 2010143948 (TORAY ADVANCED FILMS) Jan. 7, 2010 discloses a trasparent film for use notably for PV cells protection, made from a composition based on a fluororesin and a core-shell filler having a ZnO core and a silicon oxide surface layer, having average particle size of 10 to 50 nm. Its example 1 discloses a composition, comprising, as fluororesin, a commercially available ETFE resin, namely AFLON COP88 AXP, and 0.2 part by mass of ZnO particles coated with silicon oxide and having an average particle size equal to 20 nm. No explicit disclosure is provided regarding the heat of fusion of the ETFE resin.

US 2006052486 (FUJITA KENICHI) Sep. 3, 2006 discloses a resin composition comprising an inorganic-type UV absorber, having an average particle size of preferably of 30 nm or less, which may be optionally surface treated, and a thermoplastic transparent resin, which maybe ETFE. No mention is made of the heat of fusion of the ETFE resin to be used.

SUMMARY OF INVENTION

Figure 1:
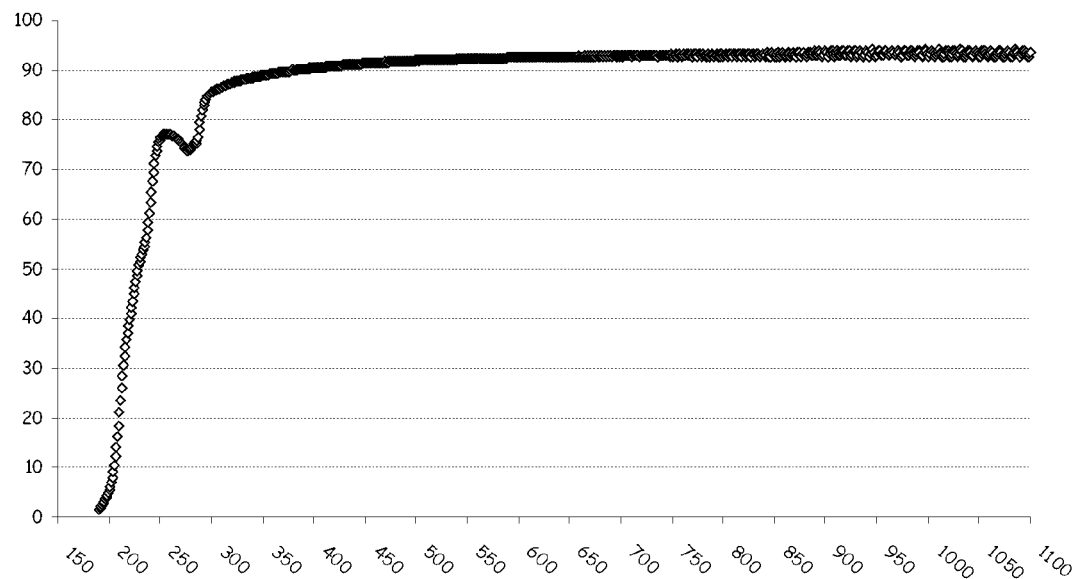
FIG. 1 is a graph of UV-Visible transmittance (in %) as a function of wavelength (in nm) from 190 nm to 1100 nm, measured with a Perkin-Elmer lambda 6 spectrophotometer for the film of ex. 1 of comparison made of ECTFE having a heat of fusion of more than 35 J/g, with no additive.

It is thus an object of the invention a thermoplastic fluoropolymer composition comprising:
- at least one semi-crystalline polymer comprising recurring units derived from ethylene and at least one of chlorotrifluoroethylene (CTFE) and tetrafluoroethylene (TFE), said polymer having a heat of fusion of at most 35 J/g [polymer (A)]; and
- from 0.05 to 5% by weight, based on weight of polymer (A), of particles of at least one inorganic UV blocker compound, said particles having an average particle size of 1 to 150 nm.

The Applicant has surprisingly found that the incorporation of said nanosized UV-blocker particles in the fluoropolymer matrix in above mentioned amounts is substantially enhanced when said fluoropolymer possesses a low degree of crystallinity (i.e. a heat of fusion below as above mentioned) so that UV-opaque films having outstanding transparency and haze properties can be obtained.

The heat of fusion of polymer (A) is determined by Differential Scanning calorimetry (DSC) at a heating rate of 10° C./min, according to ASTM D 3418.

Polymer (A) possesses a heat of fusion of at most 35 J/g, preferably of at most 30 J/g, more preferably of at most 25 J/g.

Nevertheless, it is essential for polymer (A) of being a semi-crystalline polymer, i.e. a polymer having a detectable melting point when determined according to ASTM D 3418. Without lower limit for heat of fusion being critical, it is nevertheless understood that polymer (A) will generally possess a heat of fusion of at least 1 J/g, preferably of at least 2 J/g, more preferably of at least 5 J/g.

It is well known in the art that 50/50 mol/mol ECTFE or ETFE copolymers show a maximum of crystallinity, i.e. of both melting point and heat of fusion.

The requirement for a heat of fusion of at most 35 J/g can thus be achieved either by increasing or by decreasing the amount of ethylene with respect to this 50/50 molar ratio.

It is nevertheless understood that polymers (A) which are preferred for the purpose of the invention are indeed those comprising an amount of recurring units derived from ethylene of less than 50% moles, preferably of less than 48% moles, more preferably of less than 45% moles, as they enable achieving improved properties due to the fluoromonomer components.

Polymer (A) of the composition of the invention typically comprise:
(a) from 30 to 48%, preferably from 35 to 45% by moles of ethylene (E);
(b) from 52 to 70%, preferably from 55 to 65% by moles of chlorotrifluoroethylene (CTFE), tetrafluoroethylene (TFE) or mixture thereof; and (c) from 0 to 5%, preferably from 0 to 2.5% by moles, based on the total amount of monomers (a) and (b), of one or more fluorinated and/or hydrogenated comonomer(s).

Preferably the comonomer is a hydrogenated comonomer selected from the group of the (meth)acrylic monomers. More preferably the hydrogenated comonomer is selected from the group of the hydroxyalkylacrylate comonomers, such as hydroxyethylacrylate, hydroxypropylacrylate and (hydroxy)ethylhexylacrylate, and alkyl acrylate comomnomers, such as n-butyl acrylate.

Among polymers (A), ECTFE copolymers, i.e. copolymers of ethylene and CTFE and optionally a third monomer, as above detailed, are preferred.

ECTFE polymers suitable in the composition of the invention typically possess a melting temperature not exceeding 210° C., preferably not exceeding 200° C., even not exceeding 198° C., preferably not exceeding 195° C., more preferably not exceeding 193° C., even more preferably not exceeding 190° C. The ECTFE polymer has a melting temperature of advantageously at least 120° C., preferably of at least 130° C., still preferably of at least 140° C., more preferably of at least 145° C., even more preferably of at least 150° C.

The melting temperature is determined by Differential Scanning calorimetry (DSC) at a heating rate of 10° C./min, according to ASTM D 3418.

ECTFE polymers which have been found to give particularly good results are those consisting essentially of recurring units derived from:
(a) from 35 to 47% by moles of ethylene (E);
(b) from 53 to 65% by moles of chlorotrifluoroethylene (CTFE).

End chains, defects or minor amounts of monomer impurities leading to recurring units different from those above mentioned can be still comprised in the preferred ECTFE, without this affecting properties of the material.

The melt flow rate of the ECTFE polymer, measured following the procedure of ASTM 3275-81 at 230° C. and 2.16 Kg, ranges generally from 0.01 to 75 g/10 min, preferably from 0.1 to 50 g/10 min, more preferably from 0.5 to 30 g/10 min.

The choice of the inorganic UV blocker compound is not particularly limited provided that it efficiently prevents penetration of wavelengths in the UV region, i.e. wavelengths of less than 380 nm and it remains stable at the processing conditions of polymer (A).

Selection of particles having an average particle size of 1 to 150 nm is mandatory for achieving transparency. Actually, provided that particles are used having sizes significantly smaller than the wavelength of visible light (typically from about 380 nm to about 850 nm), scattering is substantially reduced, so that visible light can penetrate and be transmitted ensuring thus transparency.

To this aim, it is generally preferred for the particles of the inorganic UV blocker to have an average particle size of at most 140 nm, preferably of at most 120 nm, more preferably of at most 100 nm, even more preferably of at most 80 nm.

Examples of heat resistant inorganic UV blocker compounds which can be used in the composition of the invention include notably compounds comprising oxides of one or more of Ce, Cu, Zn, Zr, Bi, Si, Al, Fe, Ti, Sn, and Sb.

The particles of said inorganic UV blocker compounds can additionally include other organic or inorganic compounds, typically added as surface modifiers.

Inorganic UV blocker compounds which have been found particularly useful to the purpose of the invention are those comprising $TiO_2$ and/or ZnO.

According to a first embodiment of the invention, the inorganic UV blocker compound comprises $TiO_2$, and possibly comprises at least one other inorganic oxide compound; particles of the inorganic UV blocker compound of this embodiment can optionally be treated with at least one organic dispersing agent.

Among preferred inorganic UV blocker compound particles of this embodiment, mention can be made of particles comprising:
a core consisting essentially of $TiO_2$; and
a shell consisting essentially of at least one oxide of Si, Al or mixture thereof.

While the crystalline form of $TiO_2$ is not particularly limited, it is generally understood that rutile form of $TiO_2$ will be preferred over anatase form, to the aim of depressing photocatalytic activity and decomposition phenomena deriving therefrom.

Said preferred particles may further comprises at least one other layer of a third material which can be the same of different from the materials of the core and of the shell. The particles may comprise a further coating, either completely surrounding (e.g., encapsulating) or partially covering the particle, of a suitable coating additive, such as a dispersing agent, a stabilizer, an antistatic agent and the like. Coatings of organic dispersing agents have been found particularly useful, in particular those wherein stearates (esters and salts) are used.

According to a second embodiment of the invention, the inorganic UV blocker compound comprises ZnO, and possibly comprises at least one other inorganic oxide compound; particles of the inorganic UV blocker compound of this second embodiment can optionally be treated with at least one organic dispersing agent.

The composition according to this embodiment of the invention is particularly suitable for manufacturing protective films, including films for protecting photovoltaic modules, in particular for front-sheets or back-sheets of PV cells, but also architectural membranes.

Another aspect of the present invention concerns a process for manufacturing the thermoplastic fluoropolymer composition as above described, said process comprising mixing:
the polymer (A), as above detailed; and
the particles of at least one inorganic UV blocker compound.

According to a preferred variant of the invention, the process comprises advantageously mixing by dry blending and/or melt compounding the polymer (A) and the particles, as above detailed.

Generally, the process comprises a first step wherein the polymer (A) is provided under the form of powder and is dry blended with said particles, possibly under the form of a dispersion of particles in a liquid medium so as to obtain a powder/paste mixture and a second step wherein said powder/paste mixture is melt compounded.

As an alternative, polymer (A) and the inorganic UV blocker compound particles can directly be mixed by melt compounding.

Advantageously, the polymer (A) and the inorganic UV blocker compound particles are melt compounded in continuous or batch devices. Such devices are well-known to those skilled in the art.

Examples of suitable continuous devices to melt compound the thermoplastic fluoropolymer composition of the invention are notably screw extruders. Thus, polymer (A) and the inorganic UV blocker compound particles and optionally other ingredients, are advantageously fed in an extruder and the thermoplastic fluoropolymer composition of the invention is extruded.

This operating method can be applied either with a view to manufacturing finished product such as, for instance, hollow bodies, pipes, laminates, calendared articles, or with a view to having available granules containing the desired composition, optionally additives and fillers, in suitable proportions in the form of pellets, which facilitates a subsequent conversion into finished articles. With this latter aim, the thermoplastic fluoropolymer composition of the invention is advantageously extruded into strands and the strands are chopped into pellets.

Preferably, the polymer (A) and the inorganic UV blocker compound particles are melt compounded in single-screw or twin-screw extruder. Examples of suitable extruders well-adapted to the process of the invention are those available from Leistritz, Maris America Corp. Werner and Pfleiderer and from Farrel.

Still another object of the invention is the use of the thermoplastic fluoropolymer composition of the invention for manufacturing films.

Techniques for manufacturing films are well known in the art. The composition of the invention will be preferably processed under the form of a film by cast extrusion or hot blown extrusion techniques, optionally with mono- or bi-axial orientation.

A technique particularly adapted to the manufacture of films of the composition of the invention involve extruding the molten composition through a die having elongated shape so as to obtain an extruded tape and casting/calendering said extruded tape so as to obtain a film.

Tape can be calendered into a film by passing through appropriate rolls, which can be maintained at appropriate temperatures, and whose speed can be adjusted so as to achieve the required thickness.

Films obtained from the composition of the invention are preferably transparent films, i.e. films having a total transmittance of more than 80%, preferably more than 85%, even more preferably more than 92% when determined on films having a thickness of about 50 µm, when measured according to ASTM D 1003 standard in air.

Total trasmittance and haze can also be determined according to ASTM D1003 standard in water, e.g; by placing the film in a quartz cuvette filled with deionized water.

When measured in water, as above detailed, total transmittance of films obtained from the inventive composition if generally of more than 85%, more preferably of more than 90%, even more preferably of more than 94%.

Further, in addition, films obtained from the composition of the invention are preferably such that in transmission, the scattering of light responsible for the reduction of contrast of images viewed through it is limited. In other words, films obtained from the composition of the invention have values of Haze of less than 15, preferably of less than 10%, even more preferably of less than 7%, when determined on films having a thickness of about 50 µm, when measured according to ASTM D 1003 standard in air.

Similarly, when haze is measured in water, as above detailed for total transmittance, it is generally preferred for the films obtained from the inventive compositions to possess a haze of less than 12%, more preferably of less than 8%, even more preferably of less than 5%.

Films so obtained are another object of the present invention.

The film of the invention can be advantageously assembled in a multilayer structure. Multilayer structures comprising the film of the invention are still objects of the present invention.

Assemblies which have been found particularly useful to the purposes of the invention are those wherein the film of the invention is assembled with a film made from a composition comprising at least one semi-crystalline polymer comprising recurring units derived from ethylene and at least one of chlorotrifluoroethylene (CTFE) and tetrafluoroethylene (TFE). The selection of this latter polymer is not particularly restricted; it may be notably selected among polymers having a heat of fusion below or beyond 35 J/g. It is nevertheless understood that, to the aim of increasing mechanical properties and ensuring outstanding water vapour barrier properties, assemblies wherein the film as above detailed is assembled with at least one layer made from a composition comprising at least one semi-crystalline polymer comprising recurring units derived from ethylene and at least one of chlorotrifluoroethylene (CTFE) and tetrafluoroethylene (TFE), said polymer having a heat of fusion of more than 35 J/g [polymer (B)] are preferred.

Among possible multilayer assemblies, mention can be notably made of three layer structures comprising a first layer made from a composition comprising polymer (B) as above detailed, which is generally free from UV blocker compound particles, as above specified, a second layer made from the composition of the invention, as above detailed, and a third layer made from a composition comprising polymer (B) as above detailed, which is generally free from UV blocker compound particles, as above specified, equal to or different from the composition of first layer.

Similarly to the films of the invention, the multilayer assemblies as above detailed are particularly suitable for being used as protective films for photovoltaic modules, as films for transportation, for industrial and food packaging, for pharmaceutical storage and packaging, as architectural membranes or capstocks.

Still within the frame of the present invention is thus the use of the film obtained from the composition of the invention as above detailed, and/or of the multilayer assembly comprising the same, as above specified, as protective films for photovoltaic modules, as films for transportation, for industrial and food packaging, for pharmaceutical storage and packaging, as architectural membranes or capstocks.

Should the disclosure of any patents, patent applications, and publications which are incorporated herein by reference conflict with the description of the present application to the extent that it may render a term unclear, the present description shall take precedence.

The invention will be now described in more detail with reference to the following examples, whose purpose is merely illustrative.

Raw Materials

Polymers

ECTFE-c is a 50/50 mole % ethylene/chlorotrifluoroethylene (E/CTFE) copolymer commercially available under trade name HALAR® 500 having a melting point ($T_{m2}$) of 242° C. and a heat of fusion ($\Delta H_{2f}$) of 42 J/g and a MFI of 18 g/10 min (275° C./2.16 kg).

ECTFE 1: is a 41/59 mole % E/CTFE copolymer having a melting point ($T_{m2}$) of 180° C., a heat of fusion ($\Delta H_{2f}$) of 18 J/g and a MFI of 1.4 g/10 min (230° C./2.16 kg).

Inorganic UV Blocker Compound $TiO_2$-1 is a UV-blocker made of core-shell type particles having a core of $TiO_2$ coated with a shell of mixed $Al_2O_3$—$SiO_2$ oxide, these particles being surface treated with stearic acid, commercially available under trade name HOMBITEC® RM130F from Sachtleben Chemie GmbH, having an average particle size of 15 nm, available under the form of powder. ZnO-1 is a UV-blocker made of particles of ZnO coated with a mixed $Al_2O_3$—$SiO_2$ oxide, commercially available under trade name SOLASORB® UV200F from CRODA, available under the form of liquid dispersion.

General Manufacturing Procedure of the Compositions of the Invention

The polymer, under the form of powder, and the UV blocker particles were pre-mixed in a rapid mixer equipped with a three stages paddles mixer so as to obtain a homogeneous powder mixture having required weight ratio between mentioned ingredients.

Powder mixture was then processed by extrusion in a double screw 30-34 extruder (LEISTRITZ), equipped with 6 temperature zones and a 4 mm2 holes die. Processing set points were set as follows, for ECTFE-c (Table 1) and ECTFE-1 (Table 2), respectively:

ECTFE-c

TABLE 1

| Feed zone | T1 | T2 | T3 | T4 | T5 |
|---|---|---|---|---|---|
| 210 | 225 | 240 | 250 | 260 | 270 |

Screws speed was set at 300 rpm, with a torque of 49%, so as to yield a throughput rate of about 6 kg/h, and a melt extrudate temperature of 265° C.

ECTFE-1

TABLE 2

| Feed zone | T1 | T2 | T3 | T4 | T5 |
|---|---|---|---|---|---|
| 180 | 200 | 200 | 210 | 220 | 220 |

Screws speed was set at 300 rpm, with a torque of 59%, so as to yield a throughput rate of about 6.6 kg/h, and a melt extrudate temperature of 219° C.

Extruded strands were cooled in a water bath, dried, calibrated and cut in a pelletizer.

For manufacturing thin films, pellets were processed in a 45 mm single screw extruder equipped with conventional three zones screw (L/D=24) without mixing elements. The die used was a flat-die 450 mm wide having a die gap of 550 µm. Upon exit from the die, molten tape was casted on a three subsequent chill rolls, whose speed was adapted so as to obtain a film thickness of about 50 µm. Conditions are summarized in Table 3.

TABLE 6

| Material | | ECTFE-1 | ECTFE-c |
|---|---|---|---|
| T1 | ° C. | 190 | 240 |
| T2 | ° C. | 230 | 250 |
| T3 | ° C. | 240 | 250 |
| T4 | ° C. | 240 | 255 |
| T clamp | ° C. | 235 | 260 |
| T collar | ° C. | 235 | 265 |
| T left side | ° C. | 235 | 270 |
| T back side | ° C. | 235 | 270 |
| T front side | ° C. | 235 | 270 |
| T right side | ° C. | 235 | 270 |
| T MELT (@ clamp) | ° C. | 267 | 301 |
| Head pressure | bar | 134 | 26 |
| Screw speed | rpm | 20.2 | 20 |
| Absorption | A | 41 | 23 |

TABLE 6-continued

| Material | | ECTFE-1 | ECTFE-c |
|---|---|---|---|
| Voltage | V | 6 | 6 |
| T rolls 1 | ° C. | 70 | 100 |
| T rolls 2 | ° C. | 60 | 100 |
| Calender speed 1 | m/min | 3.41 | 3.01 |
| Calender speed 2 | m/min | 3.81 | 3.62 |
| Calender speed 3 | m/min | 4.04 | 3.95 |
| Line speed | m/min | 4.11 | 3.92 |
| Film thickness | µm | ~50 | ~50 |
| Flow rate | kg/h | 8.5 | 8 |

Details of weight ratios between ingredients of the compositions are detailed in table 4.

TABLE 4

| | ECTFE polymer | UV blocker | |
|---|---|---|---|
| Run | type | type | % wt |
| 1C | ECTFE-c | none | |
| 2C | ECTFE-c | $TiO_2$-1 | 0.3 |
| 3C | ECTFE-1 | none | |
| 4 | ECTFE-1 | $TiO_2$-1 | 0.3 |
| 5 | ECTFE-1 | ZnO-1 | 0.7 |

Films Characterization

Figure 2:
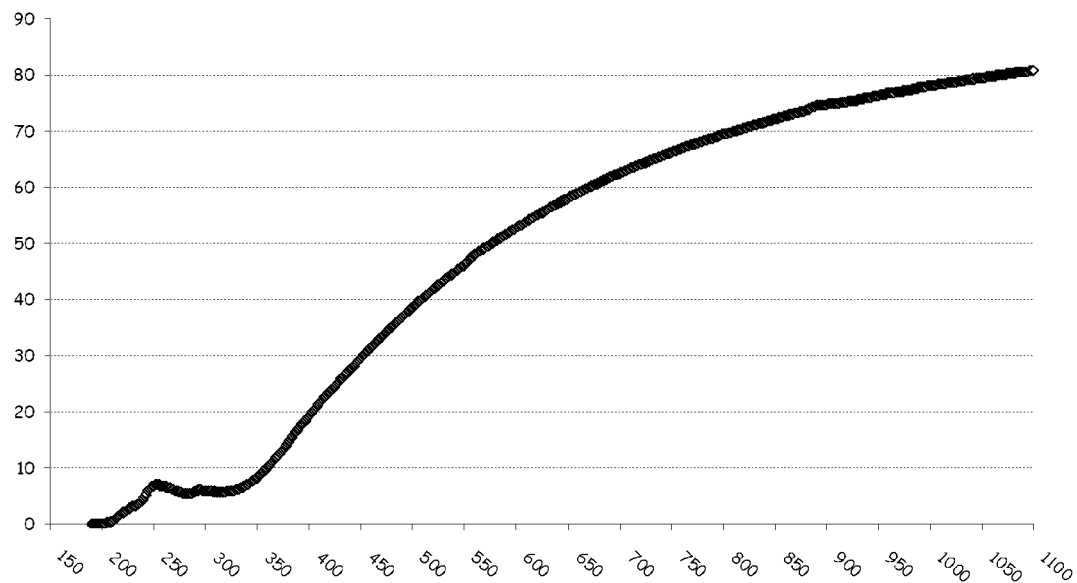
FIG. 2 is an analogous graph for the film of ex. 2 of comparison made of ECTFE having a heat of fusion of more than 35 J/g, comprising $TiO_2$ additive.
Figure 3:
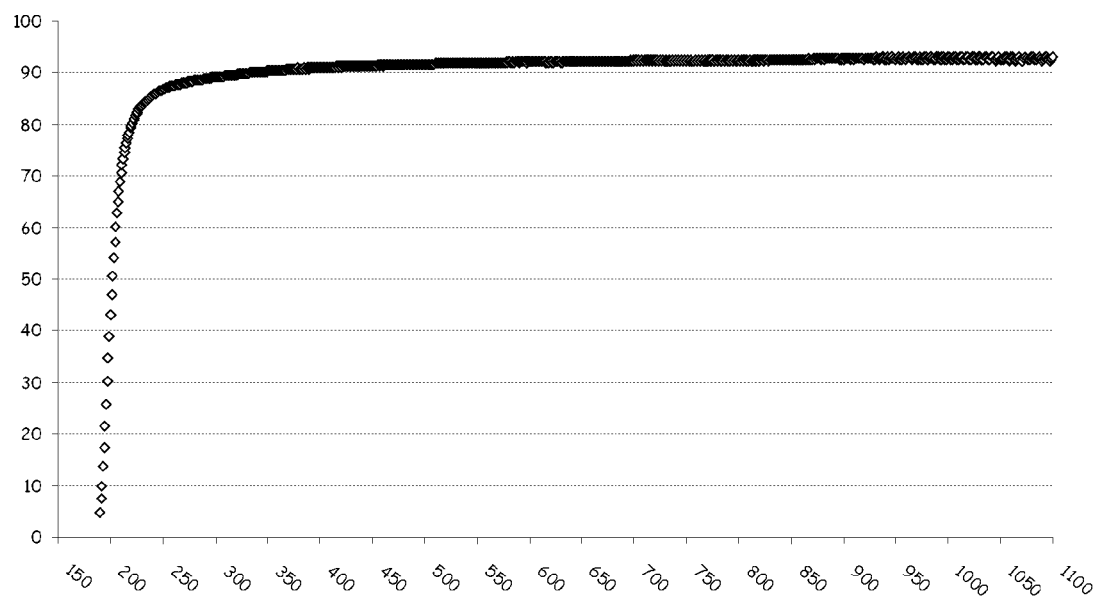
FIG. 3 is an analogous graph for the film of ex. 3 of comparison made of ECTFE having a heat of fusion of less than 35 J/g, with no additive.
Figure 4:
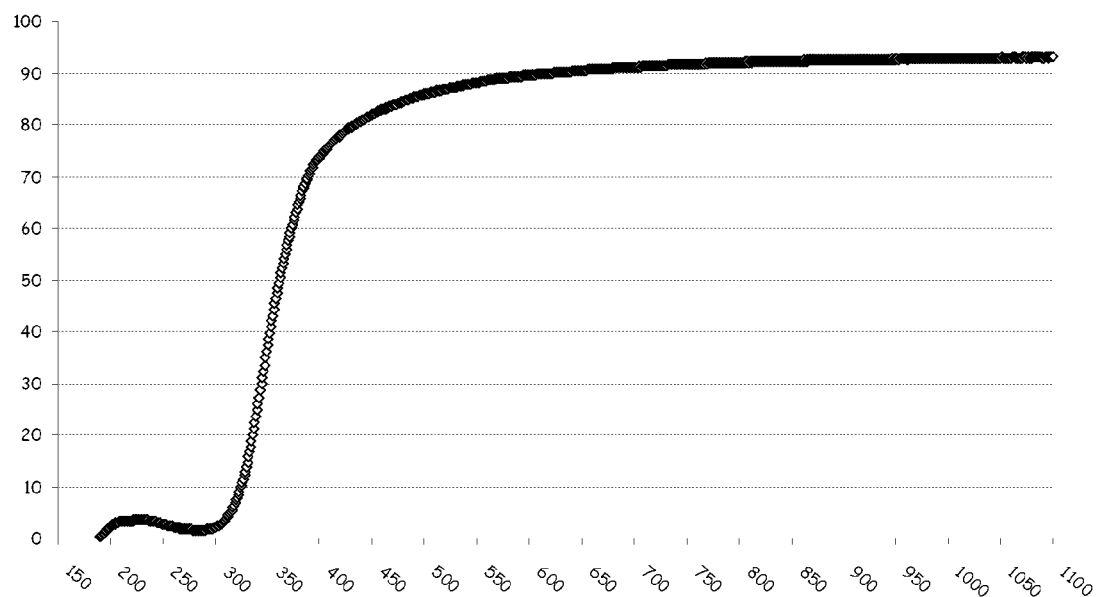
FIG. 4 is an analogous graph for the film of ex. 4 made of ECTFE having a heat of fusion of less than 35 J/g, comprising $TiO_2$ additive.
Figure 5:
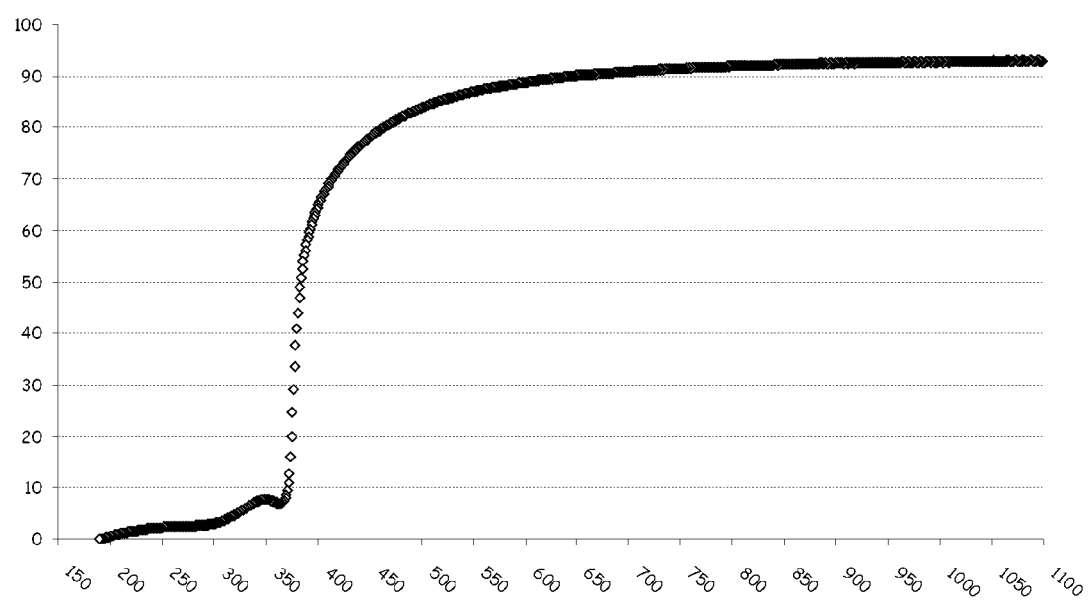
FIG. 5 is an analogous graph for the film of ex. 5 made of ECTFE having a heat of fusion of less than 35 J/g, comprising ZnO additive.

Films obtained as above detailed were submitted to optical testing. Total luminous transmittance and Haze were measured according to ASTM D1003, Procedure A, using a Gardner Haze-Gard Plus instrument. For evaluating spurious contributions possibly related to surface roughness or defects, specimens were analyzed both in air and in water, i.e. by immersing film samples in a quartz cell filled with water. Graph of UV-Visible transmittance (in %) as a function of wavelength (in nm) from 190 nm to 1100 nm, measured with a Perkin-Elmer lambda 6 spectrophotometer, are reported in FIGS. 1 to 5, for films from examples 10 (=FIG. 1), 2C (=FIG. 2), 3C (=FIG. 3), 4 (=FIGS. 4) and 5 (=FIG. 5), showing substantial opacity against UV rays for both ex. 2C, 4 and 5 (i.e. by addition of UV blocker). Nevertheless, transparency in the visible region is only maintained in films from example 4 and 5. Results summarized in table 4 are the average from three determinations on different specimens. Optical properties obtained for films having thicknesses from 40 to 60 µm are summarized in table 4.

TABLE 5

| Run | Film thickness (µm) | TT (%) In air | Haze In air | TT (%) In water | Haze In water |
|---|---|---|---|---|---|
| 1C | 40 | 94.5 | 7.2 | 98.2 | 3.4 |
| 2C | 62 | 90.7 | 39.5 | 88.0 | 34.2 |
| 3C | 60 | 94.9 | 4.3 | 99.1 | 1.6 |
| 4 | 60 | 93.3 | 7.0 | 96.4 | 3.0 |
| 3C | 57 | 92.8 | 7.6 | 94.9 | 4.1 |

The invention claimed is:

1. A method for manufacturing a film, the method comprising extruding, casting or calendering a thermoplastic fluoropolymer composition, the thermoplastic fluoropolymer composition comprising:
   at least one semi-crystalline polymer comprising recurring units derived from ethylene and at least one of chlorotrifluoroethylene (CTFE) and tetrafluoroethylene (TFE), said polymer having a heat of fusion of at most 35 J/g [polymer (A)]; and from 0.05 to 5% by weight, based on weight of polymer (A), of particles of at least one inorganic UV blocker compound, said particles having an average particle size of 1 to 150 nm, wherein polymer (A) comprises an amount of recurring units derived from ethylene of less than 50% moles, based on the total amount of monomers in the semi-crystalline polymer (A).

2. The method of claim 1, wherein polymer (A) has a heat of fusion of at most 30 J/g.

3. The method of claim 1, wherein semi-crystalline polymer (A) comprises:
   (a) from 30 to 48% moles of ethylene;
   (b) from 52 to 70% moles of chlorotrifluoroethylene (CTFE), tetrafluoroethylene (TFE) or mixtures thereof;
   (c) from 0 to 5% moles, based on the total amount of monomers (a) and (b), of one or more fluorinated and/or hydrogenated comonomer(s).

4. The method of claim 1, wherein the semi-crystalline polymer (A) is an ECTFE polymer.

5. The method of claim 1, wherein the ECTFE polymer possesses a melting temperature not exceeding 210° C.

6. The method of claim 5, wherein the ECTFE polymer consists essentially of recurring units derived from:
   (a) from 35 to 47% by moles of ethylene (E);
   (b) from 53 to 65% by moles of chlorotrifluoroethylene (CTFE).

7. The method of claim 1, wherein said particles of at least one inorganic UV blocker compound have an average particle size of at most 140 nm.

8. The method of claim 1, wherein said inorganic UV blocker compound comprises oxides of one or more of Ce, Cu, Zn, Zr, Bi, Si, Al, Fe, Ti, Sn, Sr, and Sb.

9. The method of claim 8, wherein said inorganic UV blocker compound comprises $TiO_2$ and/or ZnO.

10. The method of claim 9, wherein said particles of at least one inorganic UV blocker compound comprise:
   a core consisting essentially of $TiO_2$; and
   a shell consisting essentially of at least one oxide of Si, Al or mixture thereof; and
optionally comprise a further coating of a suitable coating additive.

11. A multilayer structure comprising a film, wherein the film comprises a thermoplastic fluoropolymer composition comprising:
   at least one semi-crystalline polymer comprising recurring units derived from ethylene and at least one of chlorotrifluoroethylene (CTFE) and tetrafluoroethylene (TFE), said polymer having a heat of fusion of at most 35 J/g [polymer (A)]; and
   from 0.05 to 5% by weight, based on weight of polymer (A), of particles of at least one inorganic UV blocker compound, said particles having an average particle size of 1 to 150 nm, wherein polymer (A) comprises an amount of recurring units derived from ethylene of less than 50% moles, based on the total amount of monomers in the semi-crystalline polymer (A).

12. The multilayer structure of claim 11, wherein polymer (A) has a heat of fusion of at most 30 J/g.

13. The multilayer structure of claim 11, wherein semi-crystalline polymer (A) comprises:
   (a) from 30 to 48% moles of ethylene;
   (b) from 52 to 70% moles of chlorotrifluoroethylene (CTFE), tetrafluoroethylene (TFE) or mixtures thereof;
   (c) from 0 to 5% moles, based on the total amount of monomers (a) and (b), of one or more fluorinated and/or hydrogenated comonomer(s).

14. The multilayer structure of claim 11, wherein the semi-crystalline polymer (A) is an ECTFE polymer.

15. The multilayer structure of claim 11, wherein the ECTFE polymer possesses a melting temperature not exceeding 210° C.

16. The multilayer structure of claim 15, wherein the ECTFE polymer consists essentially of recurring units derived from:
   (a) from 35 to 47% by moles of ethylene (E);
   (b) from 53 to 65% by moles of chlorotrifluoroethylene (CTFE).

17. The multilayer structure of claim 11, wherein said particles of at least one inorganic UV blocker compound have an average particle size of at most 140 nm.

18. The multilayer structure of claim 11, wherein said inorganic UV blocker compound comprises oxides of one or more of Ce, Cu, Zn, Zr, Bi, Si, Al, Fe, Ti, Sn, Sr, and Sb.

19. The multilayer structure of claim 18, wherein said particles of at least one inorganic UV blocker compound comprise:
   a core consisting essentially of $TiO_2$; and
   a shell consisting essentially of at least one oxide of Si, Al or mixture thereof; and
optionally comprise a further coating of a suitable coating additive.

20. A method for protecting photovoltaic modules, packaging industrial and food goods, storing and packaging pharmaceutical goods or providing architectural membranes or capstocks, the method comprising using the multilayer structure of claim 11.

* * * * *